United States Patent
Aizawa et al.

(10) Patent No.: US 8,560,112 B2
(45) Date of Patent: Oct. 15, 2013

(54) NUMERICAL CONTROLLER WITH FUNCTION TO CORRECT MOVEMENT PATH OF MACHINING PROGRAM

(75) Inventors: Nobuaki Aizawa, Minamitsuru-gun (JP);
Eiji Genma, Minamitsuru-gun (JP);
Tomokazu Kayanuma,
Minamitsuru-gun (JP)

(73) Assignee: FANUC Corporation,
Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/467,587

(22) Filed: May 9, 2012

(65) Prior Publication Data

US 2012/0310405 A1    Dec. 6, 2012

(30) Foreign Application Priority Data

Jun. 3, 2011   (JP) .................................. 2011-125773
Sep. 30, 2011  (JP) .................................. 2011-218085

(51) Int. Cl.
*G05B 19/19*        (2006.01)
(52) U.S. Cl.
USPC ......................................... 700/186; 700/159
(58) Field of Classification Search
USPC .......... 700/159, 173, 186, 187, 190, 191, 192
See application file for complete search history.

(56) References Cited

U.S. PATENT DOCUMENTS

| | | | |
|---|---|---|---|
| 5,347,461 A * | 9/1994 | Song et al. ..................... | 700/187 |
| 5,563,484 A * | 10/1996 | Otsuki et al. .................. | 700/192 |
| 6,600,965 B1 * | 7/2003 | Hull et al. ...................... | 700/182 |
| 2003/0171840 A1 * | 9/2003 | Haupt ........................... | 700/175 |
| 2012/0016514 A1 | 1/2012 | Nakamura et al. | |

FOREIGN PATENT DOCUMENTS

| | | |
|---|---|---|
| JP | 9-288509 A | 11/1997 |
| JP | 2002-132317 A | 5/2002 |
| JP | 3459155 B2 | 10/2003 |
| JP | 2006-068901 A | 3/2006 |
| JP | 2007-200037 | 8/2007 |
| WO | WO 2010/140390 A1 | 12/2010 |

\* cited by examiner

*Primary Examiner* — Charles Kasenge
(74) *Attorney, Agent, or Firm* — Drinker Biddle & Reath LLP

(57) ABSTRACT

A numerical controller controls an object for movement along a movement path according to a machining program. If consecutive command blocks are oriented in the same direction, they are set as a single vector. These three consecutive vectors (first, second, and third vectors) thus created are determined to be located at a pick-feed section if the first and third vectors are oriented in the same direction and if the length of the second vector is within a predetermined range. The movement path is corrected to a path that successively linearly connects the start point of the first vector, points on the first and third vectors, and the end point of the third vector.

8 Claims, 14 Drawing Sheets

PLANE PASSING THROUGH POINT ON FIRST VECTOR AT CERTAIN DISTANCE FROM START POINT OF SECOND VECTOR AND POINT ON THIRD VECTOR AT CERTAIN DISTANCE FROM END POINT OF SECOND VECTOR

PLANE PASSING THROUGH POINT ON FIRST VECTOR AT CERTAIN DISTANCE FROM START POINT OF SECOND VECTOR AND POINT ON THIRD VECTOR AT CERTAIN DISTANCE FROM END POINT OF SECOND VECTOR

NUMERICAL CONTROLLER WITH FUNCTION TO CORRECT MOVEMENT PATH OF MACHINING PROGRAM

RELATED APPLICATION DATA

This application claims priority under 35 U.S.C. §119 and/or §365 to Japanese Application No. 201 L-218085 filed Sep. 30, 2011 and Japanese Application No. 2011-125773 filed Jun. 3, 2011, the entire contents of which are incorporated herein by reference.

BACKGROUND OF THE INVENTION

1. Field of the Invention

The present invention relates to a numerical controller for controlling a machine tool, and more particularly, to a numerical controller with a function to correct a movement path of a machining program.

2. Description of the Related Art

A machining program for die and mold machining created by computer-aided manufacturing (CAM) or the like contains pick-feed blocks that connect adjacent movement paths. Pick-feed blocks are generally located in a non-cutting area in the case that a tool is reciprocated for cutting operation, as shown in FIG. 18. In the case of cutting along contour lines, as shown in FIG. 19, in contrast, many of pick-feed blocks are located in a cutting area. In either case, the pick-feed blocks and their adjacent blocks should preferably be smoothly connected. This is because unnecessary speed reduction may sometimes be caused by corner deceleration at a pick-feed section, acceleration clamp, or the like in the case of such a machining program that the pick-feed blocks and their adjacent blocks are not smoothly connected. If the machining program is such that pick-feed blocks are in a non-cutting area, the machining efficiency is reduced when speed reduction occurs at the pick-feed section. If the machining program is such that the pick-feed blocks are in a cutting area, on the other hand, the machined surface of a workpiece is adversely affected by cutter marks or the like when speed reduction occurs at the pick-feed section.

A technique for smoothly connecting pick-feed blocks and their adjacent blocks is disclosed in Japanese Patent Application Laid-Open No. 2007-200037. According to this technique, as shown in FIG. 20, a pick-feed section is extracted from a machining program, and paths at the pick-feed section and its adjacent air-cut sections are replaced with a high-order NURBS curve whose curvature is continuous at any point on the curve. According to the machining program with pick-feed blocks in a non-cutting area, based on this technique, speed reduction is suppressed at the pick-feed section, so that the machining efficiency can be improved.

However, the technique disclosed in Japanese Patent Application Laid-Open No. 2007-200037 is not assumed to be applied to such a machining program that pick-feed blocks are located in a cutting area. Further, this technique has a problem that it is not possible to apply to a machining program in which the pick-feed section comprises a plurality of blocks.

Thus, according to the machining program in which pick-feed blocks are located in a cutting area, the influence of speed reduction at the pick-feed section is minimized by re-creating the machining program, based on CAM that can create a movement path without a pick-feed block in the process of machining program creation, or by increasing the post-interpolation acceleration/deceleration time constant or reducing the cutting speed. However, the mold shape precision is reduced according to the method in which the post-interpolation acceleration/deceleration time constant is increased. According to the method in which the cutting speed is reduced, on the other hand, machining time is unreasonably long.

SUMMARY OF THE INVENTION

Accordingly, in order to solve the above-described problems, the object of the present invention is to provide a numerical controller with a function to prevent unnecessary speed reduction by correcting unsmooth movement paths adjacent to a pick-feed block to a smooth path, in the case of such a machining program that the pick-feed block is located in a cutting area, and to correct the movement path of the machining program so that a satisfactory machined surface can be obtained while minimizing machining time.

A numerical controller according to the present invention controls an object for movement along a movement path according to a machining program which is formed of a plurality of command blocks and in which a pick-feed block is located in a cutting area. The numerical controller comprises a determination unit configured to determine, according to a predetermined rule, whether or not consecutive command blocks are oriented in the same direction, a vector creation unit configured to set the consecutive command blocks as a single vector if it is determined by the determination unit that the command blocks are oriented in the same direction; a first determination unit, configured to determine as a first condition whether or not first and third vectors are oriented in the same direction with a second vector therebetween, where the first, second, and third vectors are three consecutive vectors generated by the vector creation unit, and a second determination unit, configured to determine as a second condition whether or not the length of the second vector is within a predetermined range; and a path correction unit configured to correct the movement path to a path which successively linearly connects a start point of the first vector, a point on the first vector at a certain distance from a start point of the second vector, a point on the third vector at a certain distance from an end point of the second vector, and an end point of the third vector, if the first and second conditions are determined to be met by the first and second determination units, respectively.

The point on the first vector at the certain distance from the start point of the second vector may be the start point of the first vector, and the point on the third vector at the certain distance from the end point of the second vector may be the end point of the third vector.

If a straight line which connects the point on the first vector at the certain distance from the start point of the second vector and the point on the third vector at the certain distance from the end point of the second vector does not intersect the second vector, the start or end point of the second vector, whichever is nearer to the straight line, is set as a waypoint, and the movement path may be corrected to a path which successively linearly connects the start point of the first vector, the point on the first vector at the certain distance from the start point of the second vector, the waypoint, the point on the third vector at the certain distance from the end point of the second vector, and the end point of the third vector.

If a straight line which connects the point on the first vector at the certain distance from the start point of the second vector and the point on the third vector at the certain distance from the end point of the second vector does not intersect the second vector, that one of points within a predetermined tolerance from the start and end points of the second vector which is located nearest to the straight line is set as a waypoint, and the movement path may be corrected to a path which successively linearly connects the start point of the first vector, the point on the first vector at the certain distance from the start point of the second vector, the waypoint, the point on the third vector at the certain distance from the end point of the second vector, and the end point of the third vector.

The numerical controller may further comprise a first calculation unit configured to calculate a plane which is parallel to the second vector and lies on the point on the first vector at the certain distance from the start point of the second vector and the point on the third vector at the certain distance from the end point of the second vector, a second calculation unit configured to calculate the shortest distance between the plane calculated by the first calculation unit and the second vector, a third determination unit configured to determine as a third condition whether or not the shortest distance between the plane and the second vector is outside a predetermined range, and a third calculation unit configured to calculate a point on the second vector which connects the point on the first vector at the certain distance from the start point of the second vector and the point on the third vector at the certain distance from the end point of the second vector, taking the shortest way. And the path correction unit may correct the movement path to a path which connects the point on the first vector at the certain distance from the start point of the second vector, the point on the second vector, and the point on the third vector at the certain distance from the end point of the second vector, taking the shortest way, if the first, second, and third conditions are determined to be met by the first, second, and third determination units, respectively.

Furthermore, the numerical controller may comprise a path correction unit configured to correct the movement path to a path which linearly connects the point on the first vector at the certain distance from the start point of the second vector and the point on the third vector at the certain distance from the end point of the second vector if the third condition is not determined to be met by the third determination unit.

According to the present invention, there may be provided a numerical controller with a function to prevent unnecessary speed reduction by correcting unsmooth movement paths adjacent to a pick-feed block to a smooth path, in the case of such a machining program that the pick-feed block is located in a cutting area, and to correct the movement path of the machining program so that a satisfactory machined surface can be obtained while minimizing machining time.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
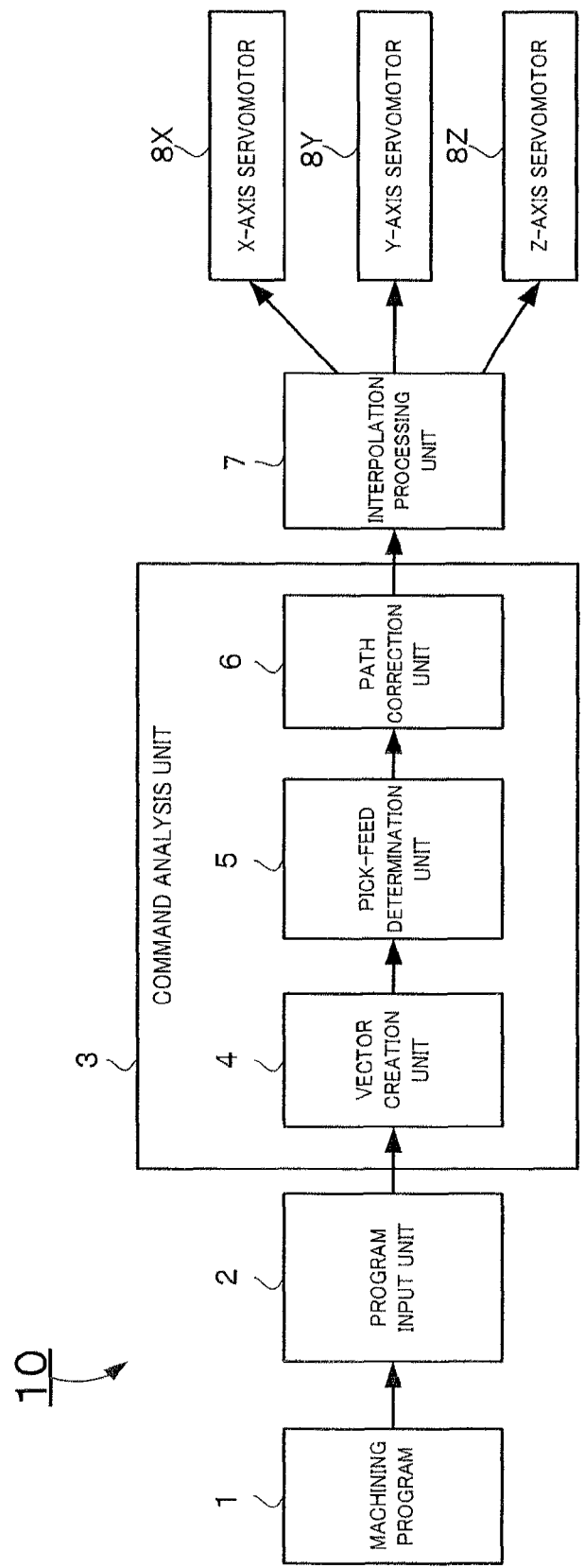
FIG. 1 is a block diagram showing one embodiment of a numerical controller according to the present invention.

FIG. 1 is a block diagram showing one embodiment of a numerical controller 10 according to the present invention.

A program input unit 2 reads a machining program 1 during execution of automatic operation and inputs it to a command analysis unit 3. The command analysis unit 3 is a preprocessing unit that generates data for interpolation from the amount of movement for each command block and a feed rate command. The data preprocessed in the command analysis unit 3 is input to an interpolation processing unit 7 and divided into move commands for individual axes (e.g., X-, Y-, and Z-axes), which are output to servomotors for the X-, Y-, and Z-axes.

Within the command analysis unit 3, a vector creation unit 4 creates vectors that each unify consecutive unidirectional command blocks and inputs them to a pick-feed determination unit 5. The pick-feed determination unit 5 checks the input vectors to see if they are pick-feed sections. If the vectors are determined to be pick-feed sections, a path is corrected by a path correction unit 6.

Figure 2:
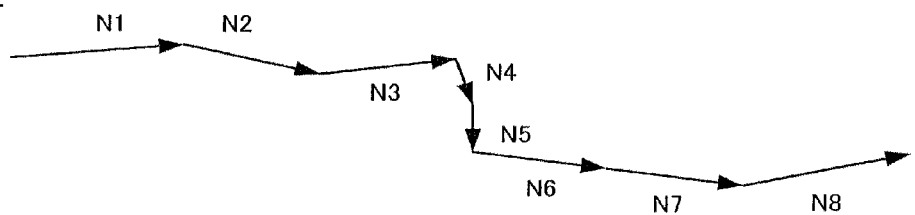
FIG. 2 is a diagram illustrating one example of a command path executed by the numerical controller of FIG. 1.

An example of a command path executed by the numerical controller 10 of FIG. 1 will now be described with reference to FIG. 2. For ease of explanation, the movement of a tool relative to a workpiece is assumed to be controlled two-dimensionally. In FIG. 2, symbols N1 to N8 designate command block paths, which are successively commanded starting with N1.

The program input unit 2 (FIG. 1) successively reads the command blocks N1 to N8 and input them to the command analysis unit 3 (FIG. 1). Then, within the command analysis unit 3, the vector creation unit 4 (FIG. 1) creates vectors that each unify consecutive unidirectional command blocks. For example, the vector creation unit 4 creates a vector from the start point of N1 to the end point of N2 and determines whether or not the length of a perpendicular line from the end point of N1 to the vector is shorter than a predetermined length. If the length of the perpendicular line is shorter, N1 and N2 are regarded as a single vector, and a vector from the start point of N1+N2 (i.e., start point of N1) to the end point of N3 is created without a break. Further, the vector creation unit 4 determines whether or not the length of a perpendicular line from the end point of N2 to the vector is shorter than the predetermined length.

Figure 3:
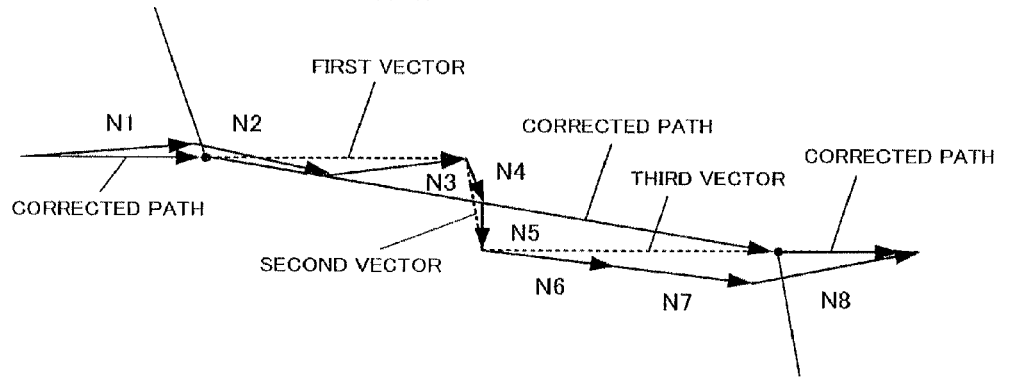
FIG. 3 is a diagram illustrating a first example of correction of the command path of FIG. 2.

Based on the above determination, it is assumed that N1 to N3 constitute a first vector, N4 and N5 constitute a second vector, and N6 to N8 constitute a third vector, as shown in FIG. 3.

The above determination is not limited to the achievement based on the foregoing conditions (the lengths of the perpendicular lines), and the conditions for the determination may be changed as required. For example, the determination may be made depending on whether or not angles between the command blocks, e.g., between N1 and N2, between N2 and N3, etc., are greater than predetermined angles.

In the pick-feed determination unit 5 (FIG. 1), in order to determine whether or not the movement path in the machining program is a pick-feed section, the determination is made depending on whether or not the first and third vectors are oriented in the same direction, as a first condition. If the angle between the first and third vectors is smaller than a predetermined angle, for example, these vectors are determined to be oriented in the same direction. Further, the determination is made depending on whether or not the length of the second vector is within a predetermined range, as a second condition.

If both the first and second conditions are met, the first to third vectors are determined to be pick-feed sections. It is to be understood that this determination is not limited to those conditions and may be made based on modified conditions, if necessary.

If the first to third vectors are determined to be the pick-feed sections, the path correction unit 6 (FIG. 1) corrects the movement path to a smooth path that successively linearly connects the start point of the first vector, a point on the first vector at a certain distance (D1) from the start point of the second vector (or the end point of the first vector), a point on the third vector at a certain distance (D2) from the end point of the second vector (or the start point of the third vector), and the end point of the third vector, as shown in FIG. 3. The distances D1 and D2 may be either equal (D1=D2) or different.

Figure 4:
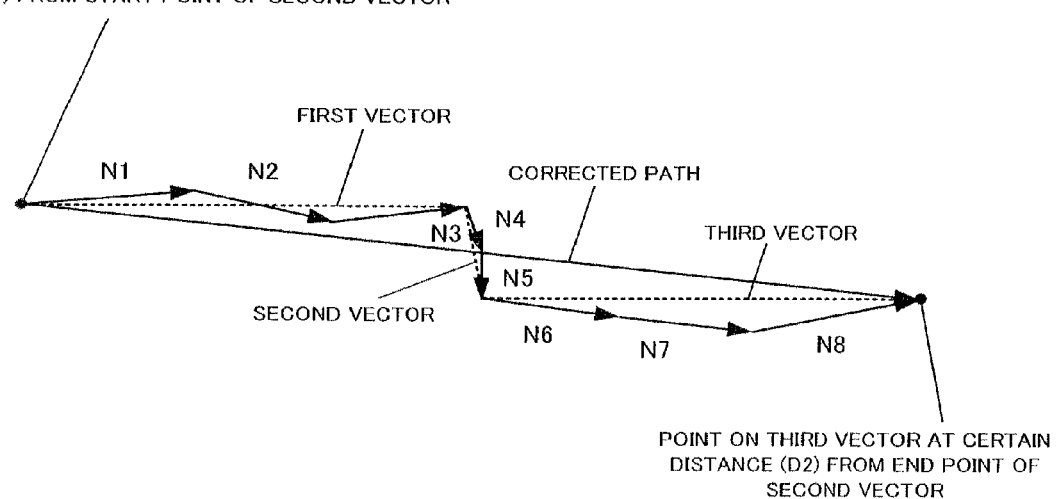
FIG. 4 is a diagram illustrating a second example of correction of the command path of FIG. 2.

For ease of arithmetic processing, the "point on the first vector at the certain distance from the start point of the second vector" and the "point on the third vector at the certain distance from the end point of the second vector" may be made coincident with the start point of the first vector and the end point of the third vector, respectively, so that the movement path can be corrected to a path that linearly connects the start point of the first vector and the end point of the third vector, as shown in FIG. 4.

Figure 5:
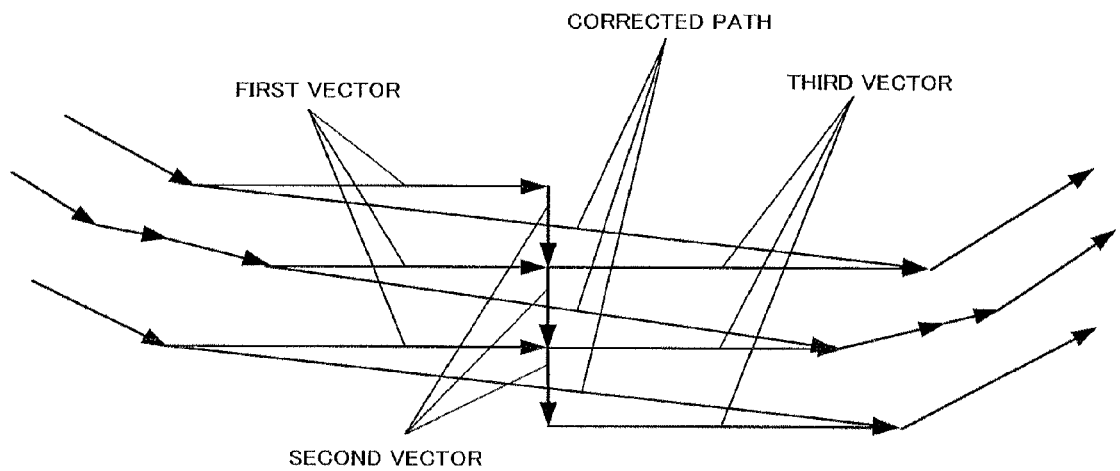
FIG. 5 is a diagram illustrating another example of the command path to which the method of command path correction shown in FIG. 4 is not applicable.
Figure 6:
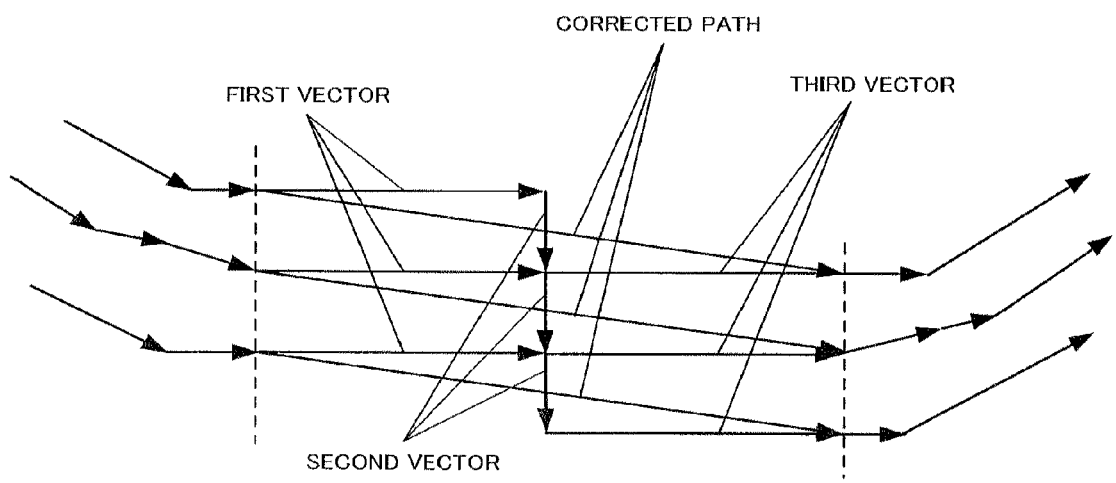
FIG. 6 is a diagram illustrating the method of command path correction shown in FIG. 5.

If the respective first or third vector lengths of adjacent movement paths are different, as shown in FIG. 5, however, the parallelism between the adjacent movement paths may be broken, possibly adversely affecting the machined surface. Thus, this method is not feasible. In this case, the movement path should be corrected to the smooth path that successively linearly connects the start point of the first vector, the point on the first vector at the certain distance from the start point of the second vector, the point on the third vector at the certain distance from the end point of the second vector, and the end point of the third vector, as shown in FIG. 6.

If a straight line that connects the point on the first vector at the certain distance from the start point of the second vector and the point on the third vector at the certain distance from the end point of the second vector does not intersect the second vector, moreover, the start or end point of the second vector, whichever is nearer to the straight line, is set as a waypoint. Based on this, the movement path can also be corrected to a path that successively linearly connects the start point of the first vector, the point on the first vector at the certain distance from the start point of the second vector, the above-mentioned waypoint, the point on the third vector at the certain distance from the end point of the second vector, and the end point of the third vector.

Figure 7A:
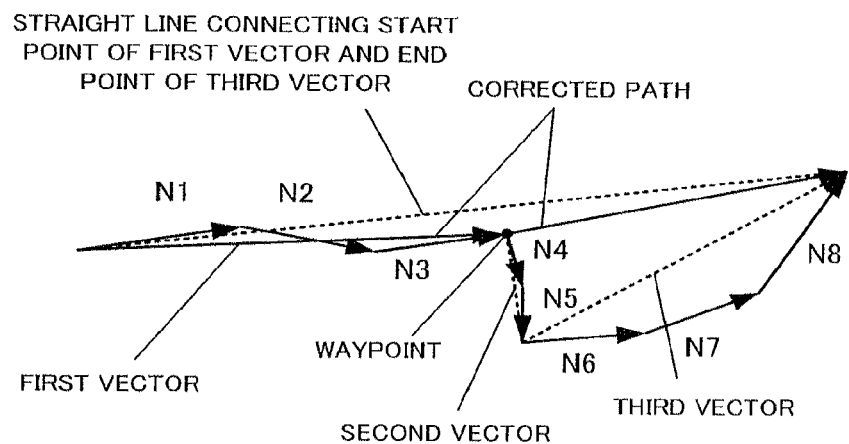
FIGS. 7A and 7B are diagrams individually illustrating two examples in which a corrected command path connects the start point of a first vector, a waypoint, and the end point of a third vector, the position of the waypoint in FIG. 7A being different from that in FIG. 7B.
Figure 7B:
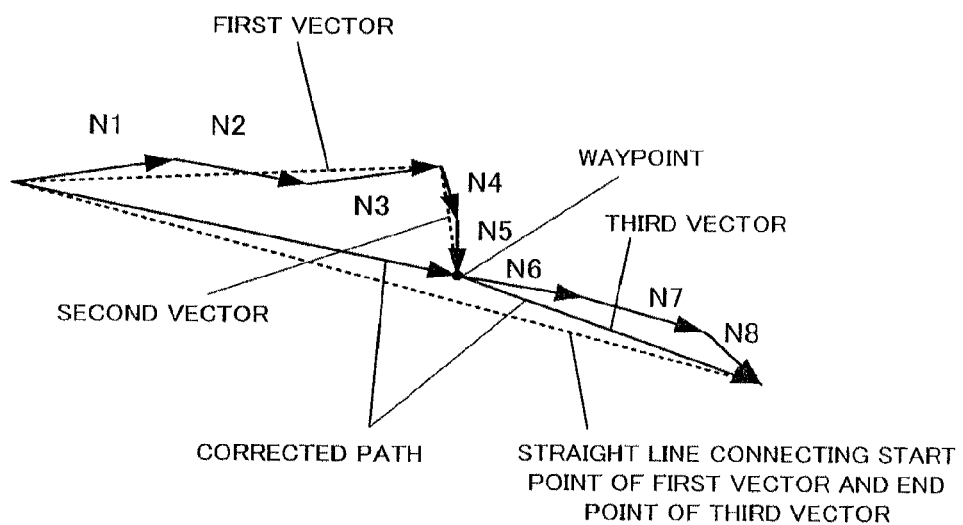

FIGS. 7A and 7B illustrate a case where the "point on the first vector at the certain distance from the start point of the second vector" and the "point on the third vector at the certain distance from the end point of the second vector" are made coincident with the start point of the first vector and the end point of the third vector, respectively. In FIG. 7A, a waypoint on the corrected path is set as the start point of the second vector, whereas in FIG. 7B, a waypoint on the corrected path is set as the end point of the second vector.

If the straight line that connects the point on the first vector at the certain distance from the start point of the second vector and the point on the third vector at the certain distance from the end point of the second vector does not intersect the second vector, furthermore, that one of points within a predetermined tolerance from the start and end points of the second vector which is located nearest to the straight line is set as a waypoint. Based on this, the movement path can also be corrected to the path that successively linearly connects the start point of the first vector, the point on the first vector at the certain distance from the start point of the second vector, the above-mentioned waypoint, the point on the third vector at the certain distance from the end point of the second vector, and the end point of the third vector.

Figure 8:
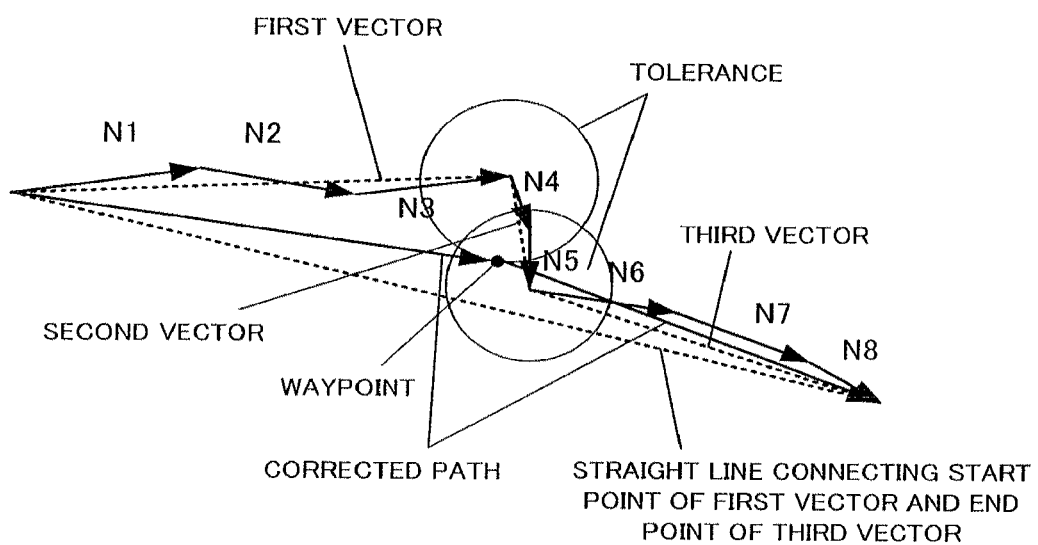
FIG. 8 is a diagram illustrating an example in which the corrected command path connects the start point of the first vector, the waypoint, and the end point of the third vector.

FIG. 8 illustrates the case where the "point on the first vector at the certain distance from the start point of the second vector" and the "point on the third vector at the certain distance from the end point of the second vector" are made coincident with the start point of the first vector and the end point of the third vector, respectively.

Figure 9:
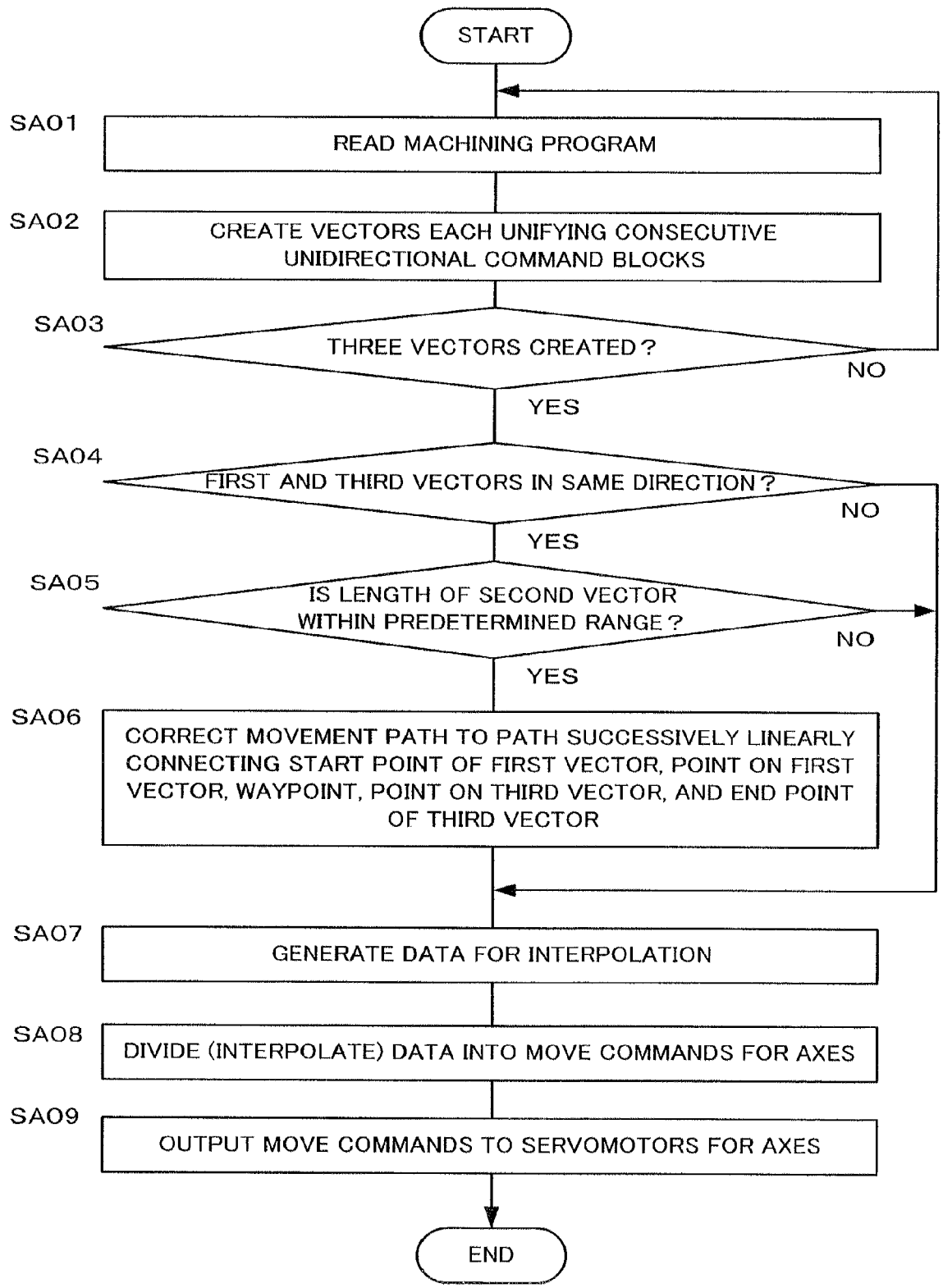
FIG. 9 is a flowchart illustrating an algorithm of processing for command path correction executed by the numerical controller of FIG. 1.
Figure 10:
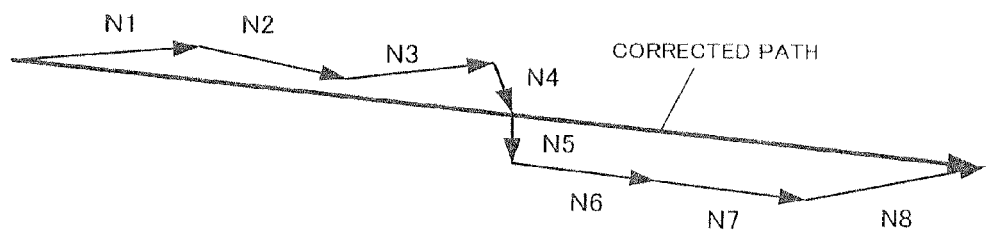
FIG. 10 is a diagram illustrating an aspect of correction in which unsmooth movement paths adjacent to a pick-feed block is corrected to a smooth path.

FIG. 9 is a flowchart illustrating an algorithm of processing for command path correction executed by the numerical controller 10 according to the embodiment of the present invention shown in FIG. 1. The following is a sequential description of various steps of operation.

[Step SA01] A machining program is read.

[Step SA02] Vectors that each unify consecutive unidirectional command blocks are created. The created vectors are temporarily stored in a storage device in the numerical controller 10 in the order of creation.

[Step SA03] It is determined whether or not the three consecutive vectors, the first to third vectors, are already created. If the vectors are not yet created, the program returns to Step SA01. If the vectors are already created, the program proceeds to Step SA04.

[Step SA04] It is determined whether or not the first and third vectors are oriented in the same direction. If the vectors are not oriented in the same direction, the program proceeds to Step SA07. If the vectors are oriented in the same direction, the program proceeds to Step SA05.

[Step SA05] It is determined whether or not the length of the second vector is within the predetermined range. If the length is not within the predetermined range, the program proceeds to Step SA07. If the length is within the predetermined range, the program proceeds to Step SA06.

[Step SA06] The movement path is corrected to the path that successively linearly connects the start point of the first vector, the point on the first vector, the waypoint, the point on the third vector, and the end point of the third vector.

[Step SA07] Data for interpolation is generated.

[Step SA08] The data is divided (interpolated) into move commands for the individual axes.

[Step SA09] The move commands are output to the servomotors for the individual axes, whereupon this processing ends.

If the corrected movement path does not intersects a pick-feed block, in the movement path correction described above, a path that passes through the start or end point of the pick-feed block, whichever is nearer to the corrected path, or a point located within a certain tolerance from the start or end point of the pick-feed block, whichever is nearer, is determined to be a final corrected path (see FIGS. 3 to 8 and FIG. 10).

If there are no corrected path vector and pick-feed vector on the same plane, in the movement path correction described above, however, no machining program is assumed such that a pick-feed block is located at a peak or trough of a machining shape, for example. In this case, a sharply bent path is inevitably formed that passes through the start or end point of the pick-feed block or a point located within a tolerance from the start or end point of the pick-feed block, whichever is nearer. Consequently, there is a possibility of a smooth path not being able to be formed. Thus, the best machining time may not be able to be achieved with such a machining program that a pick-feed block is located at a peak or trough of a machining shape.

Figure 11:
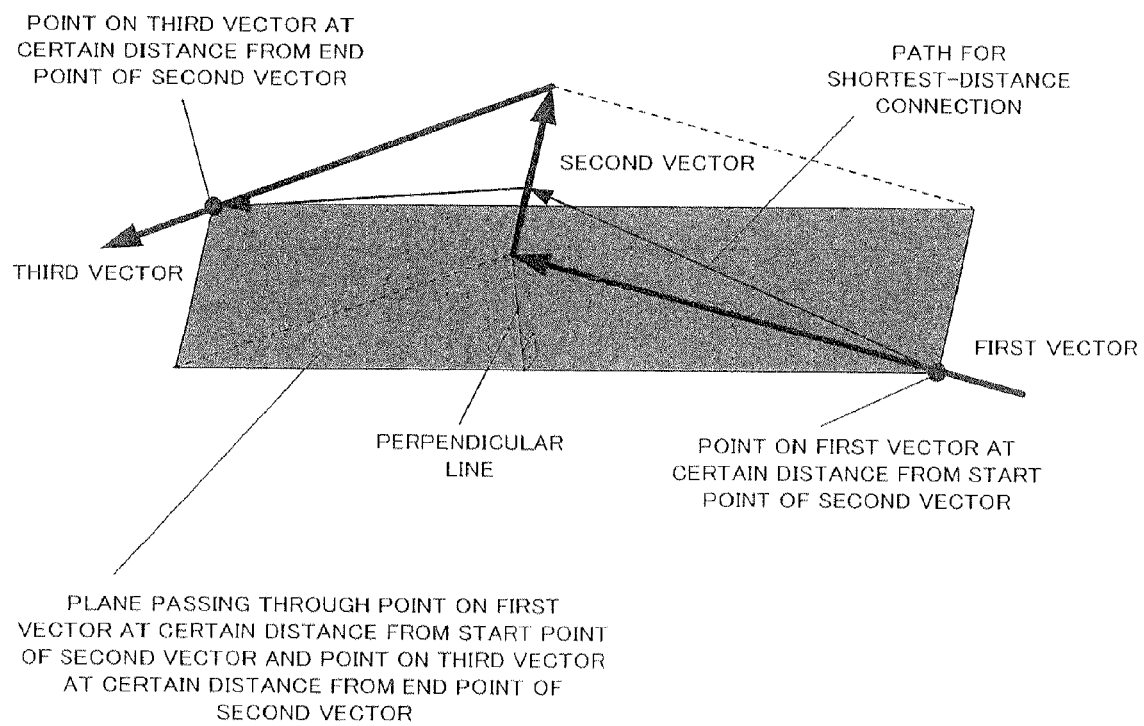
FIG. 11 is a diagram illustrating another aspect of correction in which unsmooth movement paths adjacent to a pick-feed block is corrected to a smooth path.

Thereupon, if the distance between the second vector according to the above-described embodiment of the present invention and a plane that is parallel to the second vector and passes through a point on the first vector at a certain distance from the start point of the second vector and a point on the third vector at a certain distance from the end point of the second vector is greater than a predetermined value, a correction is performed to connect the point on the first vector at the certain distance from the start point of the second vector, a point on the second vector, and the point on the third vector at the certain distance from the end point of the second vector, taking the shortest way, as another aspect of movement path correction (see FIG. 11). If the distance between the second vector and the plane is smaller than the predetermined value, the movement path is corrected to a smooth path that linearly connects the point on the first vector at the certain distance from the start point of the second vector and the point on the third vector at the certain distance from the end point of the second vector.

Consequently, a smooth path can be created without ruining the shape of the peak or trough of the machining program configuration even if a pick-feed block is located at the peak or trough.

Figure 12:
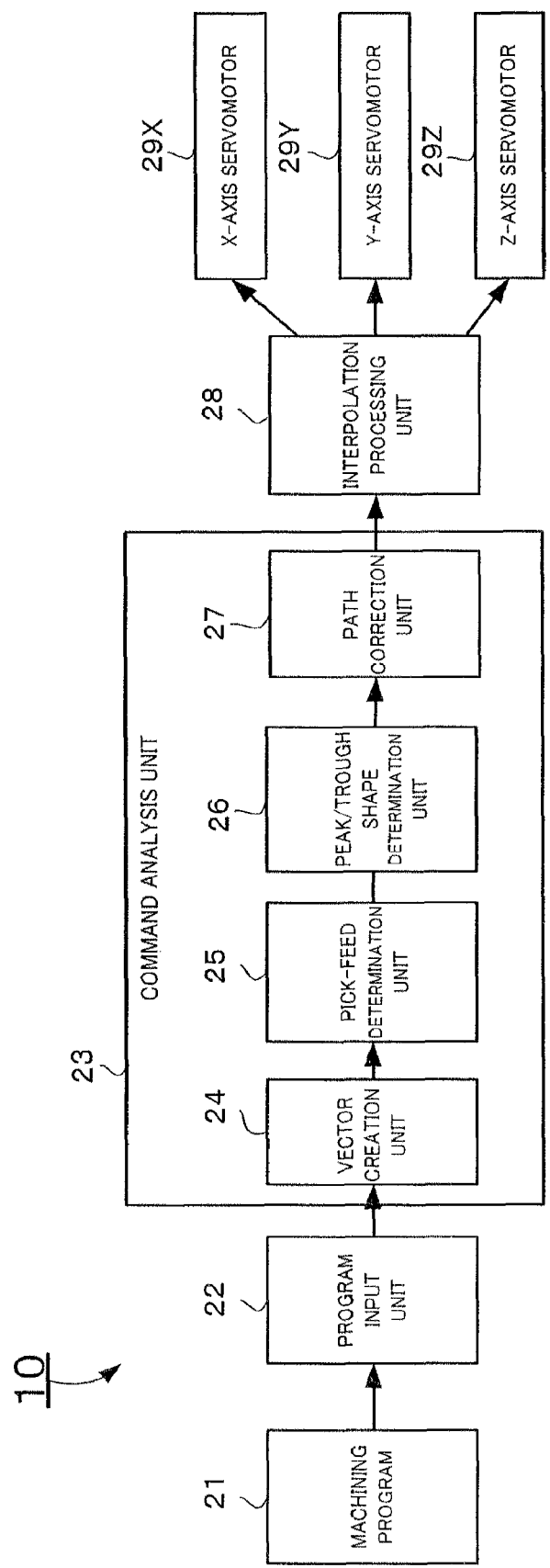
FIG. 12 is a block diagram showing another embodiment of the numerical controller according to the present invention.

FIG. 12 is a block diagram showing another embodiment of the numerical controller 10 according to the present invention.

A program input unit 22 reads a machining program 21 during execution of automatic operation and inputs it to a command analysis unit 23. The command analysis unit 23 is a preprocessing unit that generates data for interpolation from the amount of movement for each command block and a feed rate command. The data preprocessed in the command analysis unit 23 is input to an interpolation processing unit 28 and divided into move commands for individual axes (e.g., X-, Y-, and Z-axes), which are output to X-, Y-, and Z-axis servomotors 29X, 29Y and 29Z for the axes.

Within the command analysis unit 23, a vector creation unit 24 creates vectors that each unify consecutive unidirectional command blocks and inputs them to a pick-feed determination unit 25. The pick-feed determination unit 25 checks the input vectors to see if they are pick-feed sections. If the vectors are determined to be pick-feed sections, it is determined in a peak/trough shape determination unit 26 whether the pick-feed block is at the peak or trough of the machining program configuration.

Figure 13:
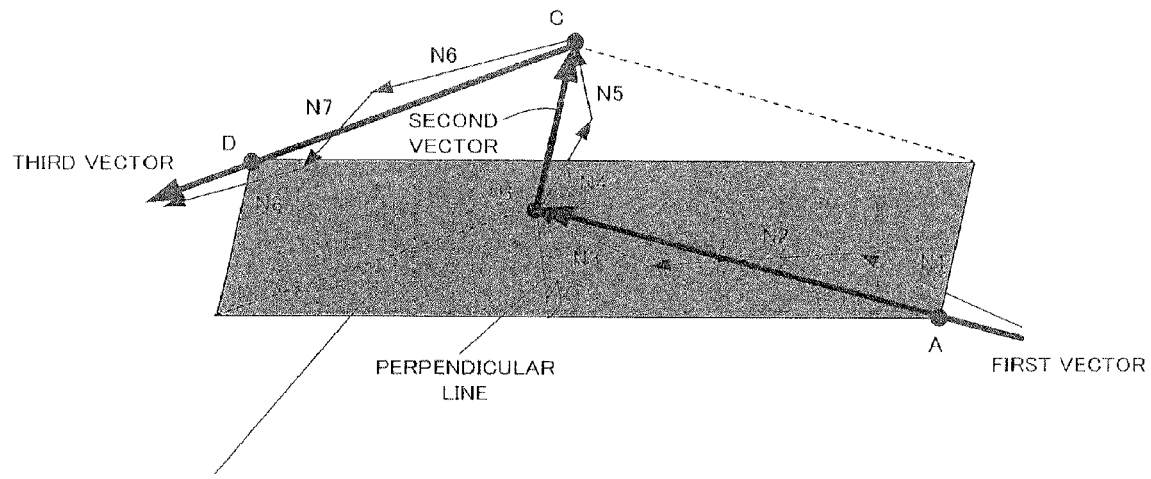
FIG. 13 is a diagram illustrating a case where such a command path that a pick-feed block is located at a peak of a machining program configuration.

The following is a description of a case where such a command path that the pick-feed block is located at the peak of the pick-feed configuration is executed, as shown in FIG. 13. In FIG. 13, symbols N1 to N8 designate command block paths described in the machining program, which are successively commanded starting with N1.

The program input unit 22 successively reads the command blocks N1 to N8 and input them to the command analysis unit 23. Then, within the command analysis unit 23, the vector creation unit 24 creates vectors that each unify consecutive unidirectional command blocks.

In order to determine whether or not the three created vectors, the first to third vectors, are pick-feed sections, the pick-feed determination unit 25 determines whether or not the first and third vectors are oriented in the same direction, as a first condition. Further, the pick-feed determination unit 25 determines whether or not the length of the second vector is within a predetermined range, as a second condition. If both the first and second conditions are met, the first to third vectors are determined to be the pick-feed sections.

In order to determine whether the pick-feed sections have a peak shape or a trough shape in the case that the first to third vectors are the pick-feed sections, the peak/trough shape determination unit 26 calculates a plane that is parallel to the second vector and passes through a point A on the first vector at a certain distance from the start point of the second vector and a point D on the third vector at a certain distance from the end point of the second vector, and determines whether or not the length of a perpendicular line from the second vector to the plane is longer than a predetermined length (see FIG. 13).

Figure 14:
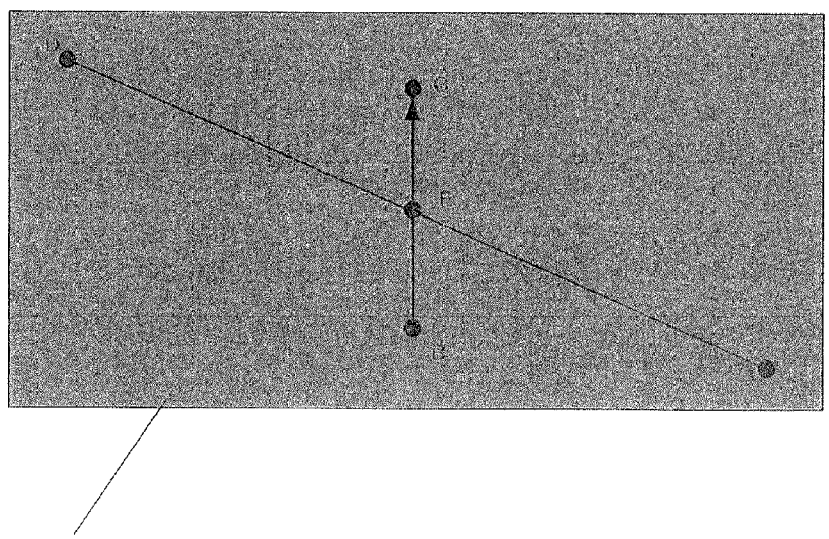
FIG. 14 is a diagram illustrating how to determine a point of intersection between a straight line on a plane parallel to a second vector and a straight line along which the second vector is projected on the plane.
Figure 15:
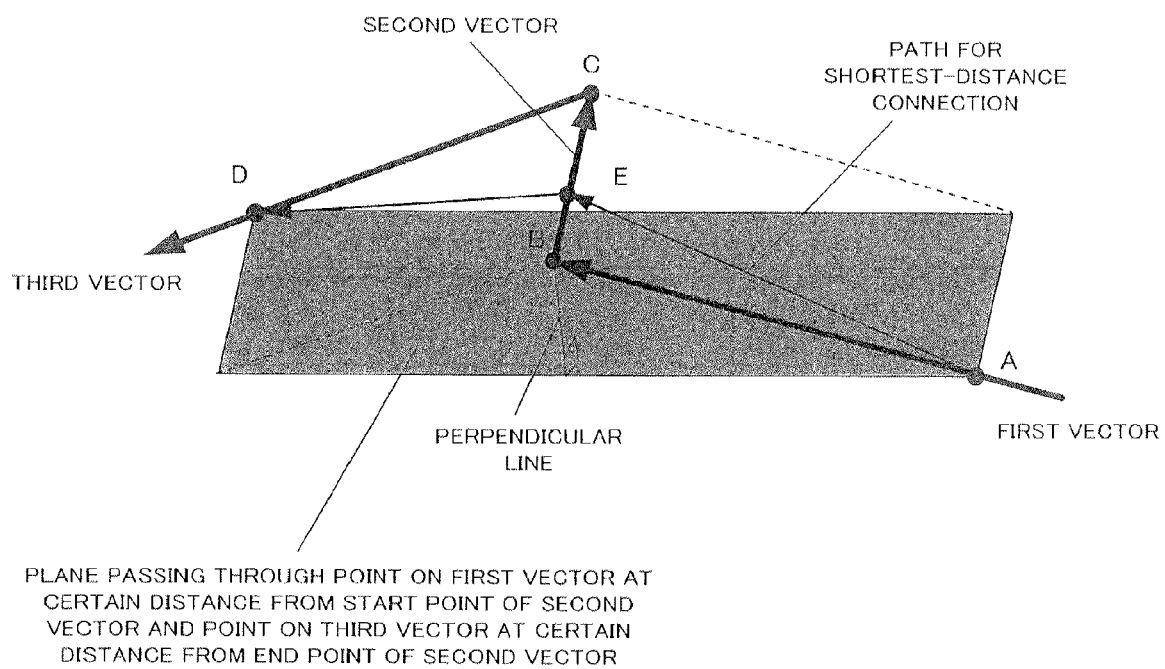
FIG. 15 is a diagram illustrating how to correct a movement path to the shortest path that passes through a point on the second vector.

If the perpendicular line is longer than the predetermined length, a path correction unit 27 corrects the movement path to a smooth path that connects the point A, the point on the second vector, and the point D, taking the shortest way. As shown in FIG. 14, for example, a point of intersection E' between a straight line AD on the plane and a straight line B'C' along which the second vector is projected on the plane is determined. As shown in FIG. 15, moreover, a point E at which the point E' is projected on the second vector is determined, and the movement path is corrected to a smooth path that successively linearly connects the points A, E and D, that is, the shortest path that passes through the point on the second vector.

If the perpendicular line is shorter than the predetermined length, the movement path is corrected to a smooth path that linearly connects the points A and D. If the straight line AD on the plane and the straight line B'C' do not intersect, the movement path may be corrected to a path that successively linearly connects the point A, the start or end point B or C, and the point D, according to the embodiment of the invention. The straight line that connects the points A and D when the perpendicular line is shorter than the predetermined length is not shown in FIG. 15.

In the command analysis unit 23, data for interpolation is generated based on the movement path corrected by the path correction unit 27 and input to the interpolation processing unit 28. In the interpolation processing unit 28, the data is divided into the move commands for the individual axes (e.g., X-, Y-, and Z-axes), which are output to the X-, Y-, and Z-axis servomotors 29X, 29Y and 29Z for the axes.

Figure 16:
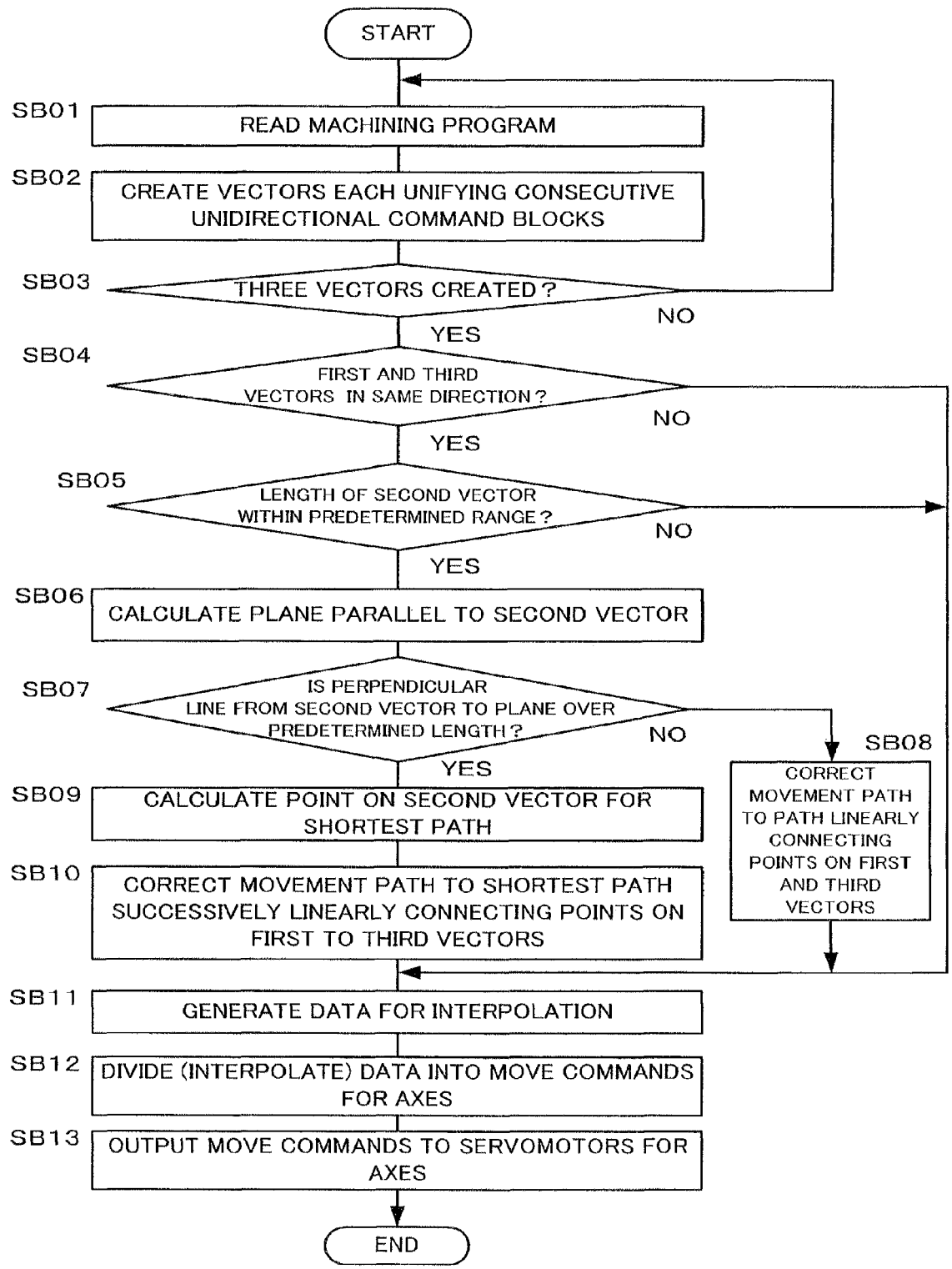
FIG. 16 is a flowchart illustrating an algorithm of processing for command path correction executed by the numerical controller of FIG. 12.

FIG. 16 is a flowchart illustrating an algorithm of processing for command path correction executed by the numerical controller 10 of FIG. 12. The following is a sequential description of various steps of operation.

[Step SB01] A machining program is read.

[Step SB02] Vectors that each unify consecutive unidirectional command blocks are created. The created vectors are temporarily stored in a storage device in the numerical controller 10 in the order of creation.

[Step SB03] It is determined whether or not the three consecutive vectors, the first to third vectors, are already created. If the vectors are not yet created, the program returns to Step SB01. If the vectors are already created, the program proceeds to Step SB04.

[Step SB04] It is determined whether or not the first and third vectors are oriented in the same direction. If the vectors are not oriented in the same direction, the program proceeds to Step SB11. If the vectors are oriented in the same direction, the program proceeds to Step SB05.

[Step SB05] It is determined whether or not the length of the second vector is within the predetermined range. If the length is not within the predetermined range, the program proceeds to Step SB11. If the length is within the predetermined range, the program proceeds to Step SB06.

[Step SB06] A plane parallel to the second vector is calculated.

[Step SB07] It is determined whether the length of a perpendicular line from the second vector to the plane calculated in Step SB06 is not less than a predetermined length. If the length of the perpendicular line is not less than the predetermined length, the program proceeds to Step SB09. If the length is less than the predetermined length, the program proceeds to Step SB08.

[Step SB08] The movement path is corrected to a path that linearly connects points on the first and third vectors, whereupon the program proceeds to Step SB11.

[Step SB09] A point on the second vector, which will provide the shortest path, is calculated.

[Step SB10] The movement path is corrected to the shortest path that successively linearly connects points on the first to third vectors.

[Step SB11] Data for interpolation is generated.

[Step SB12] The data is divided (interpolated) into move commands for the individual axes.

[Step SB13] The move commands are output to the servomotors for the individual axes, whereupon this processing ends.

Figure 17:
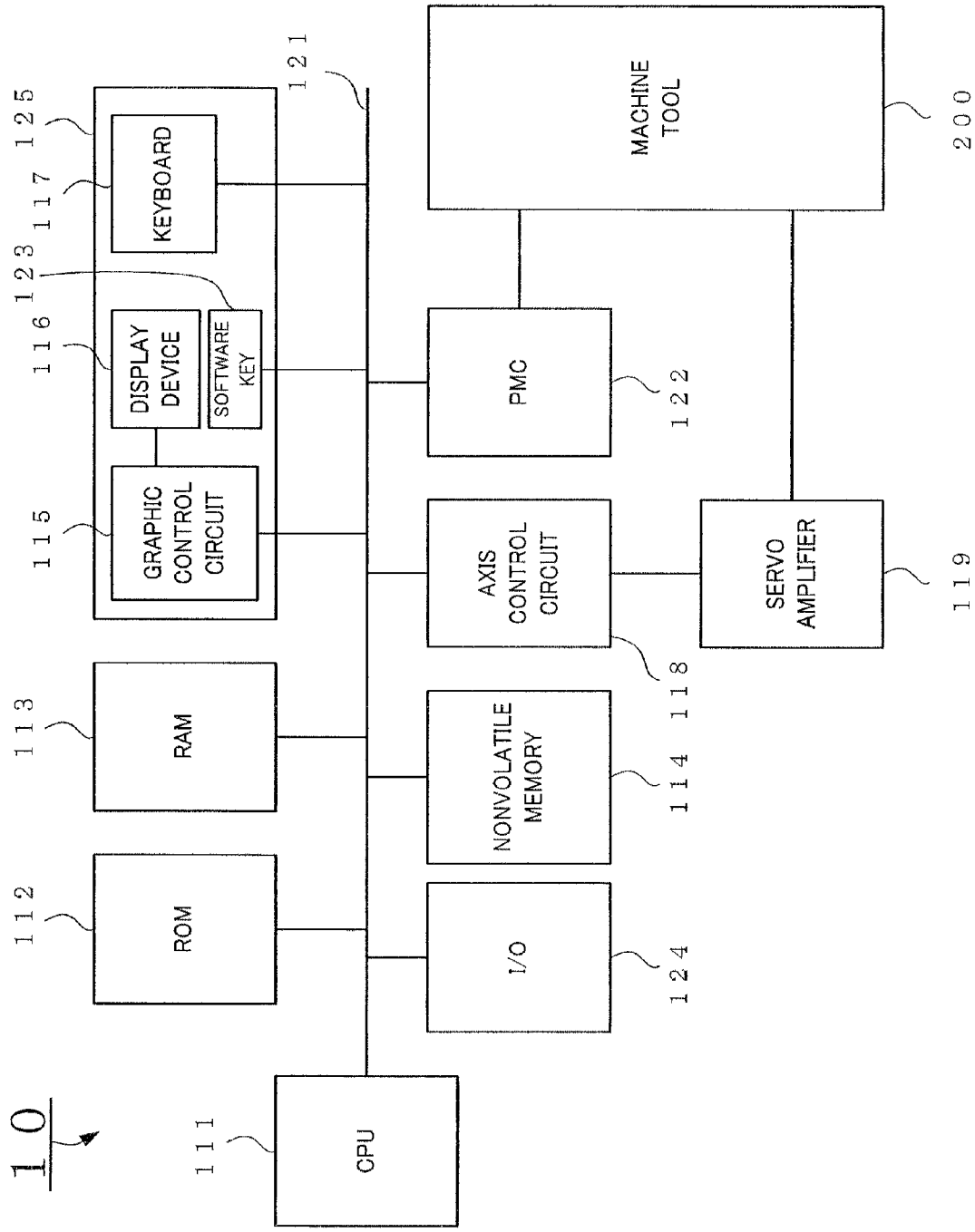
FIG. 17 is a block diagram showing an outline of the numerical controller according to the present invention having a function to correct the movement path of a machining program.
Figure 18:
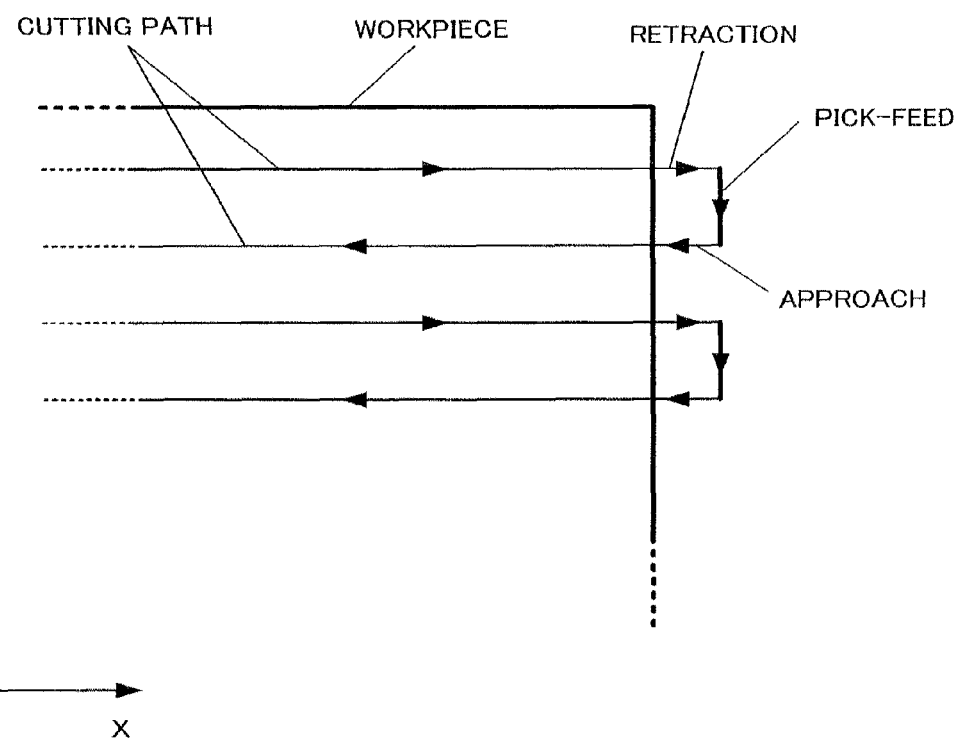
FIG. 18 is a diagram illustrating how pick-feed blocks are located in a non-cutting area in the case that a tool is reciprocated relative to a workpiece to cut the workpiece.
Figure 19:
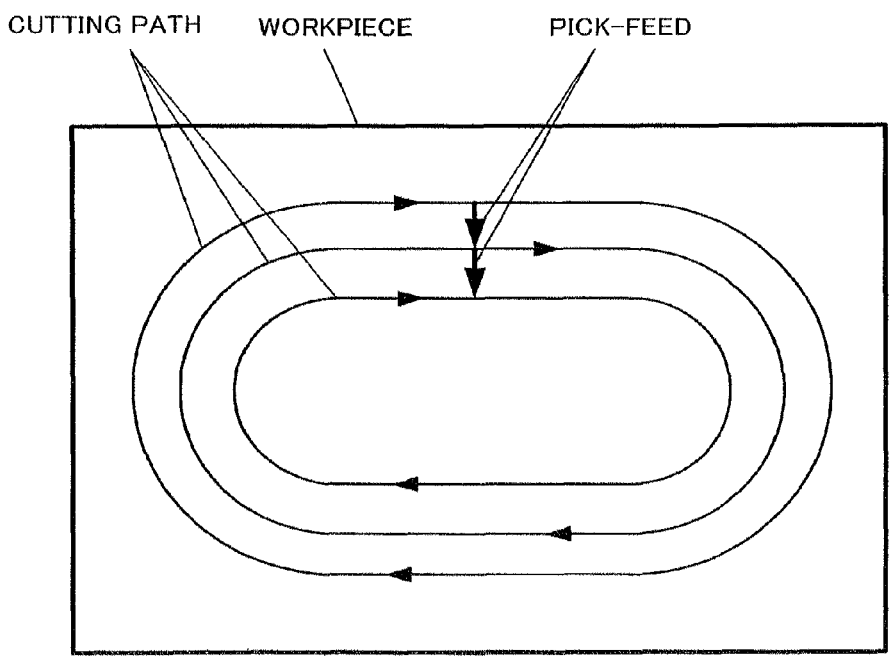
FIG. 19 is a diagram illustrating how pick-feed blocks are located in a cutting area in the case of cutting along contour lines.
Figure 20:
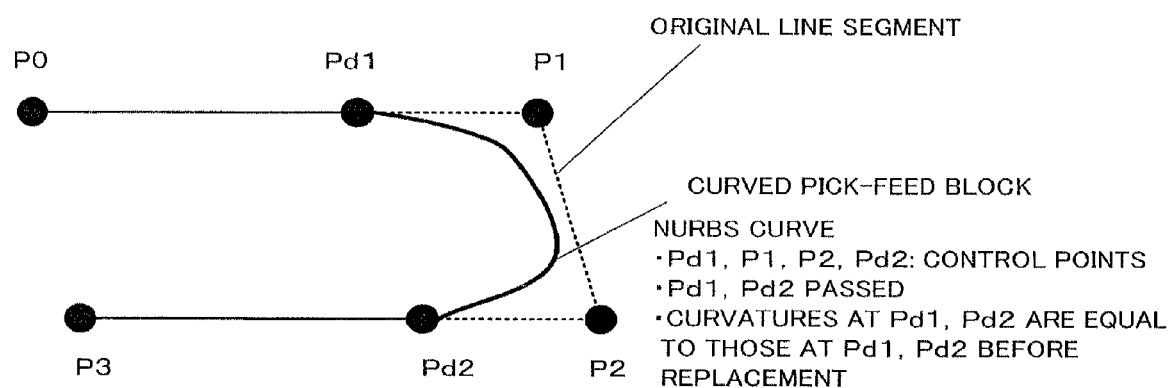
FIG. 20 is a diagram illustrating a prior art in which paths at a pick-feed section and its adjacent air-cut sections are replaced with a high-order NURBS curve whose curvature is continuous at any point on the curve.

FIG. 17 is a block diagram showing an outline of the numerical controller according to the present invention having a function to correct the movement path of the machining program.

A CPU 111 as a processor controls the entire numerical controller 10 according to a system program stored in a ROM 112. Various data or input/output signals are stored in a RAM 113. Various data stored in a nonvolatile memory 114 remain stored in the memory even after power is turned off. The first to third vectors are temporarily stored in the RAM 113. The determination in Step SA03 in the flowchart of FIG. 9 on whether or not the creation of the three consecutive vectors (first to third vectors) is completed can be made based on, for example, whether or not these three vectors are stored into the RAM 113. Further, the first to third vectors can be specified by being stored in the order of creation. A graphic control circuit 115 converts a digital signal into a signal for display and delivers it to a display device 116. A keyboard 117 is means, including numeric keys, character keys, etc., for inputting various setting data.

An axis control circuit 118 receives move commands for the individual axes from the CPU 111 and outputs them to a servo amplifier 119. On receiving these move commands, the servo amplifier 119 drives servomotors (not shown) of a machine tool 200. These constituent elements are connected to one another by a bus 121. A programmable machine controller (PMC) 122 receives a T-function signal (tool selection command) and the like through the bus 121 during execution of the machining program. Then, the PMC 122 processes this signal according to a sequence program and outputs it as an operation command, thereby controlling the machine tool 200. On receiving a state signal from the machine tool 200, moreover, the PMC 122 transfers a necessary input signal to the CPU 111. Further, the bus 121 is connected with a software key 123 whose function varies according to the system program or the like and an interface 124 through which NC data is delivered to an external device such as a storage device. This software key 123, along with the display device 116 and the keyboard 117, is disposed on a display/manual data input (MDI) panel 125.

The invention claimed is:

1. A numerical controller which controls an object for movement along a movement path according to a machining program which is formed of a plurality of command blocks and in which a pick-feed block is located in a cutting area, comprising:

a microprocessor;

a memory coupled to the microprocessor, the memory storing:

a determination unit configured to determine, according to a predetermined rule, whether or not consecutive command blocks are oriented in the same direction;

a vector creation unit configured to set the consecutive command blocks as a single vector if it is determined by the determination unit that the command blocks are oriented in the same direction;

a first determination unit, configured to determine as a first condition whether or not first and third vectors are oriented in the same direction with a second vector therebetween, where the first, second, and third vectors are three consecutive vectors generated by the vector creation unit, and a second determination unit, configured to determine as a second condition whether or not the length of the second vector is within a predetermined range; and a path correction unit configured to correct the movement path to a path which successively linearly connects a start point of the first vector, a point on the first vector at a certain distance from a start point of the second vector, a point on the third vector at a certain distance from an end point of the second vector, and an end point of the third vector, if the first and second conditions are determined to be met by the first and second determination units, respectively.

2. The numerical controller according to claim 1, wherein the point on the first vector at the certain distance from the start point of the second vector is the start point of the first vector, and the point on the third vector at the certain distance from the end point of the second vector is the end point of the third vector.

3. The numerical controller according to claim 1, wherein if a straight line which connects the point on the first vector at the certain distance from the start point of the second vector and the point on the third vector at the certain distance from the end point of the second vector does not intersect the second vector, the start or end point of the second vector, whichever is nearer to the straight line, is set as a waypoint, and the movement path is corrected to a path which successively linearly connects the start point of the first vector, the point on the first vector at the certain distance from the start point of the second vector, the waypoint, the point on the third vector at the certain distance from the end point of the second vector, and the end point of the third vector.

4. The numerical controller according to claim 1, wherein if a straight line which connects the point on the first vector at the certain distance from the start point of the second vector and the point on the third vector at the certain distance from the end point of the second vector does not intersect the second vector, that one of points within a predetermined tolerance from the start and end points of the second vector which is located nearest to the straight line is set as a waypoint, and the movement path is corrected to a path which successively linearly connects the start point of the first vector, the point on the first vector at the certain distance from the start point of the second vector, the waypoint, the point on the third vector at the certain distance from the end point of the second vector, and the end point of the third vector.

5. The numerical controller according to claim 1, further comprising a first calculation unit configured to calculate a plane which is parallel to the second vector and lines on the point on the first vector at the certain distance from the start point of the second vector and the point on the third vector at the certain distance from the end point of the second vector, a second calculation unit configured to calculate the shortest distance between the plane calculated by the first calculation unit and the second vector, a third determination unit configured to determine as a third condition whether or not the shortest distance between the plane and the second vector is outside a predetermined range, and a third calculation unit configured to calculate a point on the second vector which connects the point on the first vector at the certain distance from the start point of the second vector and the point on the third vector at the certain distance from the end point of the second vector, taking the shortest way, wherein the path correction unit corrects the movement path to a path which connects the point on the first vector at the certain distance from the start point of the second vector, the point on the second vector, and the point on the third vector at the certain distance from the end point of the second vector, taking the shortest way, if the first, second, and third conditions are determined to be met by the first, second, and third determination units, respectively.

6. The numerical controller according to claim 5, wherein the path correction unit further corrects the movement path to a path which linearly connects the point on the first vector at the certain distance from the start point of the second vector and the point on the third vector at the certain distance from the end point of the second vector if the third condition is not determined to be met by the third determination unit.

7. The numerical controller according to claim 2, wherein if a straight line which connects the point on the first vector at the certain distance from the start point of the second vector and the point on the third vector at the certain distance from the end point of the second vector does not intersect the second vector, the start or end point of the second vector, whichever is nearer to the straight line, is set as a waypoint, and the movement path is corrected to a path which successively linearly connects the start point of the first vector, the point on the first vector at the certain distance from the start point of the second vector, the waypoint, the point on the third vector at the certain distance from the end point of the second vector, and the end point of the third vector.

8. The numerical controller according to claim 2, wherein if a straight line which connects the point on the first vector at the certain distance from the start point of the second vector and the point on the third vector at the certain distance from the end point of the second vector does not intersect the second vector, that one of points within a predetermined tolerance from the start and end points of the second vector which is located nearest to the straight line is set as a waypoint, and the movement path is corrected to a path which successively linearly connects the start point of the first vector, the point on the first vector at the certain distance from the start point of the second vector, the waypoint, the point on the third vector at the certain distance from the end point of the second vector, and the end point of the third vector.

* * * * *